*INVENTOR.*
FRANK T. INNES
BY Ralph K. Bonell
AGENT

Sept. 19, 1961 F. T. INNES 3,000,555

DIGITAL COMPUTER INPUT

Filed March 4, 1955 11 Sheets-Sheet 2

INVENTOR.
FRANK T. INNES

BY

AGENT

INVENTOR.
FRANK T. INNES
BY
Ralph K. Bonell
AGENT

Sept. 19, 1961 F. T. INNES 3,000,555

DIGITAL COMPUTER INPUT

Filed March 4, 1955 11 Sheets-Sheet 4

INVENTOR.
FRANK T. INNES

BY

Ralph K. Bonell

AGENT

INVENTOR.
FRANK T. INNES
BY
Ralph K. T. Snell
AGENT

INVENTOR.
FRANK T. INNES
BY
Ralph K. Bonell
AGENT

DIGITAL COMPUTER INPUT

Filed March 4, 1955 11 Sheets-Sheet 7

DECODER,
SECTION 1651
(INSTRUCTIONS)

INVENTOR.
FRANK T. INNES
BY
Ralph K. Bonell
AGENT

* CORRESPONDING DESIGNATIONS FOR SECTION 165U: INPUT TERMINAL 207, RELAYS 221-1, ETC.

*INVENTOR.*
FRANK T. INNES
*BY*
Ralph K. Bonell
AGENT

INVENTOR.
FRANK T. INNES
BY
Ralph K. T. Bonell
AGENT

INVENTOR.
FRANK T. INNES
BY
Ralph K. Bonell
AGENT

INVENTOR.
FRANK T. INNES
BY
Ralph K. Bonell
AGENT

3,000,555
DIGITAL COMPUTER INPUT

Frank T. Innes, Malvern, Pa., assignor to Burroughs Corporation, Detroit, Mich., a corporation of Michigan Filed Mar. 4, 1955, Ser. No. 492,285
27 Claims. (Cl. 235—61.6)

This invention relates to electronic digital computers and it refers principally to input apparatus by means of which operating instructions and data stored by a punched paper tape or like storage medium are supplied to the computer in suitable form for utilization thereby.

The input means and associated circuitry of the present invention although capable of useful application as an adjunct to computers of various types will be described herein more particularly as an adjunct to the type of computer disclosed in the co-pending application of G. G. Hoberg, L. E. Mott, J. R. Van Andel, E. W. Veitch and R. C. Weise for Electronic Computer Serial No. 492,062, filed March 4, 1955. The structure, circuitry and functions of such a computer, and of the components thereof, may be ascertained by reference to the specification and drawings of the said application. Only such features as are pertinent to the practice of the present invention will be specifically referred to herein.

Electronic digital computers, in solving a problem, require a source or sources of data, including the values of the variables of the problem and of known constant relationships, together with a set of operating instructions which, taken collectively and in sequence, constitute a program for the solution of the problem. Both data and instructions are stored by suitable media of one type or another from which they are read as needed, as electric signals. In many computers instructions as well as at least a portion of the data are stored in internal memory devices, such as magnetic drums or discs. In the computer of application Serial No. 492,062 input data are introduced manually by means of a keyboard device, constants and intermediate results of computational processes are stored by a magnetic drum, and instructions are set up in an external memory device termed a "pinboard" or "pinboard assembly," comprising a crossbar type of switchboard on which interconnections between bars at their intersections can be made by inserting pins in a rectangular matrix of holes. A complete instruction or "instruction word" (including an address, when applicable) requires one to three such connections. The pinboard is scanned electrically to sense the completed connections and supply corresponding operating signals to the computer. Special instructions can be interspersed with those set at the pinboard by transferring operational control of the computer to a manual control panel for a desired period. The results of a computation are printed automatically by an output printer associated with the input keyboard in a typewriter-like instrument.

The use of a pinboard of the type referred to provides a very flexible and easily operable means for setting up and for changing the instructions of a program. However, space considerations usually limit the size of the pinboard or the number of unit pinboards making up a complete pinboard assembly. As a result, in solving especially complex problems or problems of an unusual nature, the speed of solution may be limited because of the departure from a straightforward program made necessary by the limited number of instructions which can be set up.

In part to overcome the above disadvantage and to provide substantially unlimited capacity for instructions, the present invention makes use, in a novel manner, of a medium for storing and feeding instructions into the computer which will be referred to generally herein as a punched tape, although it will be realized in reading the detailed description of the circuits and of the operation of the invention that there are other storage media which may have the same function, such as punched cards and magnetic tape. A particular type of punched paper tape record is mentioned in the detailed description of the present equipment in which a character (numeral, letter or sign) is represented by a code comprising up to six holes (plus an additional hole for checking purposes, where called for) the holes of an encoded character extending transversely of the tape and their positions being sensed simultaneously in the reading process.

In practicing the invention not only may instructions be stored by punched tape, but a part or all of the data required for the solution of a problem may be stored in the same way. With the method of supplying instructions and data to the computer here made use of there is no need for intermediate storage devices, particularly for storing instructions, such as have commonly been made use of in prior computers, both instruction and data signals from the tape being utilized directly by the computer. This results in a simplification of equipment and of routine.

Operation of the computer from the tape input equipment is initiated by setting up a special instruction at the pinboard (normally in control) which, when reached in the scanning of the board, results in stopping the scanning process and the transferral of control to the tape reader and associated input equipment. When the required instruction or combination of instructions and data punched in the tape have passed by the reading device and have been supplied to the computer as electrical signals, a coded instruction punched in the tape causes a re-transferral of control to the pinboard. Another instruction set at the pinboard may be made use of to transfer control to the manual control panel, instead of to the tape, where instructions, for example instructions which occur only once in a program or which require judgement on the part of the operator based on the progress of the computation, may be set up by means of multi-contact rotary switches.

In the operation of the tape input equipment itself, the instruction signals obtained by sensing the positions of the coded holes in the tape are translated by relay and other intermediate equipment into a form which is directly usable by the computer and these translated signals are applied to the same leads which receive instruction signals from the pinboard and manual control panel. Signals representing data characters pass through a portion of the intermediate equipment which processes the instruction signals and after further processing are then applied to the arithmetic section of the computer in the same manner as are data signals obtained from the internal memory.

In the combination of input devices separately referred to above, means are made available for assigning the storage of instructions forming different portions of a complete computer program to the type of input device best suited to the purpose. Where, in a program, a limited number of instructions are required in a routine or subroutine and where a change of instructions is apt to be called for, the flexibility of the pinboard is an advantage. Where a large number of instructions are called for and where particular data not found in the internal memory of the computer are used, the unlimited capacity of the tape becomes an asset, particularly in setting up a straightforward program of computation without awkward and unobvious routines required by limited instruction capacity. Finally, where operator judgement in setting up instructions is required or there are other reasons for overriding the set routines in the pinboard and tape, manual control can be made use of.

The invention has, among its other objects, the provision of means whereby these various methods of operation may be coordinated, and employed in a single program, if desired, without undue multiplication of equipment.

It is another object to provide improved means for supplying operating information to an electronic digital computer over individual paths in accordance with encoded operating instructions and encoded numerical data.

Another object is to provide improved means for reading encoded information stored as groups of holes in a tape or in a similar manner and for translating the information thus read into a form acceptable as an input to an electronic digital computer of a particular type.

Another object is to provide improved means for selectively reading single encoded characters or a sequence of encoded characters of predetermined length stored by punched holes in a tape or in a similar manner in connection with other media and for applying decoded signals corresponding thereto to individual input leads of an electronic digital computer.

Another object is to provide improved means for distinguishing between single encoded digits and plural character encoded instruction words read from a storage medium and for applying signals representing said digits and said instructions to an arithmetic section and an instructions section, respectively, of an electronic digital computer.

Another object is to provide improved electric circuit means for synchronizing the operation of tape input or like equipment with the operation of an electronic digital computer to which it supplies operating information.

Another object is to provide improved means for recognizing and decoding encoded characters stored as holes punched in a tape and for applying the decoded signals to the input of an electronic digital computer in suitable time relationship to the operation thereof.

Another object is to provide, as an adjunct to a computer having means defining a plurality of operating states, means controlling the operation of tape input equipment therefor in synchronism with the occurrences of such states.

A further object is to provide improved means for transferring control of an electronic digital computer between a pinboard-type memory device normally furnishing instructions for the operation of the computer and tape input equipment serving as an adjunct to the computer, to furnish additional or alternative instructions to the computer.

Other objects and advantages of the invention will be apparent upon consideration of the following specification, taken in conjunction with the appended drawings in which.

Figure 1:
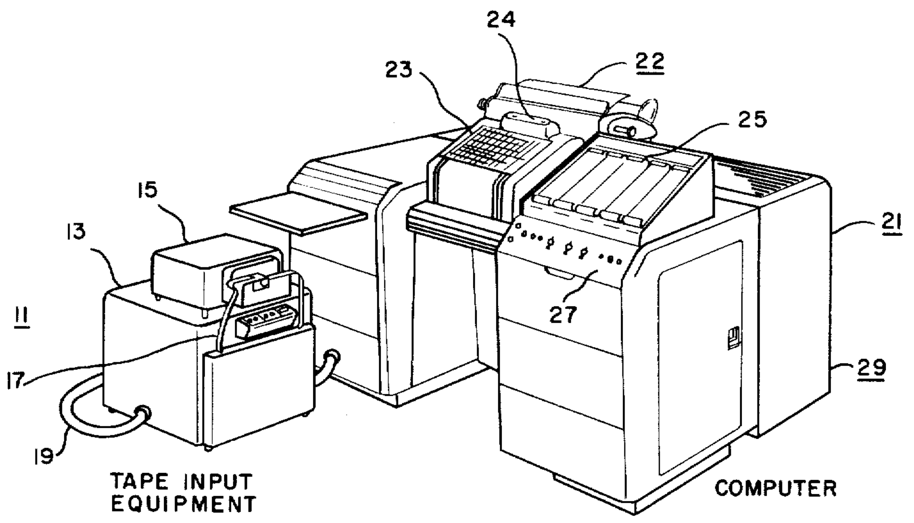
FIG. 1 is a perspective view of an assembly of an electronic digital computer and tape input equipment therefor, in accordance with the principles of the invention.

The general arrangement of the input equipment, in its use as an adjunct to a computer of the type above referred to, is shown in FIG. 1. The input equipment, generally referenced as 11, comprises a cabinet 13 housing relays and other input circuit components, together with a tape reader 15 for sensing coded information punched on a paper tape 17. This assembly is connected by cable 19 to the computer proper 21. Cabinet 13 is wheel-mounted so that it may readily be positioned in a location convenient for the operator of the computer.

Certain card-mounted components of the input circuitry closely related to the computer circuits are assembled with the computer equipment.

*General features of computer and input equipment*

Computer 21, assumed to be of the general type disclosed in application Serial No. 492,062, comprises keyboard-printer unit 22 having a keyboard 23 and a printer 24, a pinboard assembly 25 (shown as including five pinboard units) for setting up a program of instructions, a manual control panel 27 mounting switches for optional manual control of the computer, and various computing circuits and devices, including a magnetic drum (not shown in FIG. 1) as an internal memory.

Computer 21 when operated alone, receives input data by way of keyboard 23 of printer-keyboard unit 22 and processes the data internally in accordance with the program of instructions set up on the several pinboards of pinboard assembly 25, with the supplementary instructions provided by manual control panel 27, if used. The output data are printed by the printer portion 24 of printer-keyboard unit 22.

Figure 5:
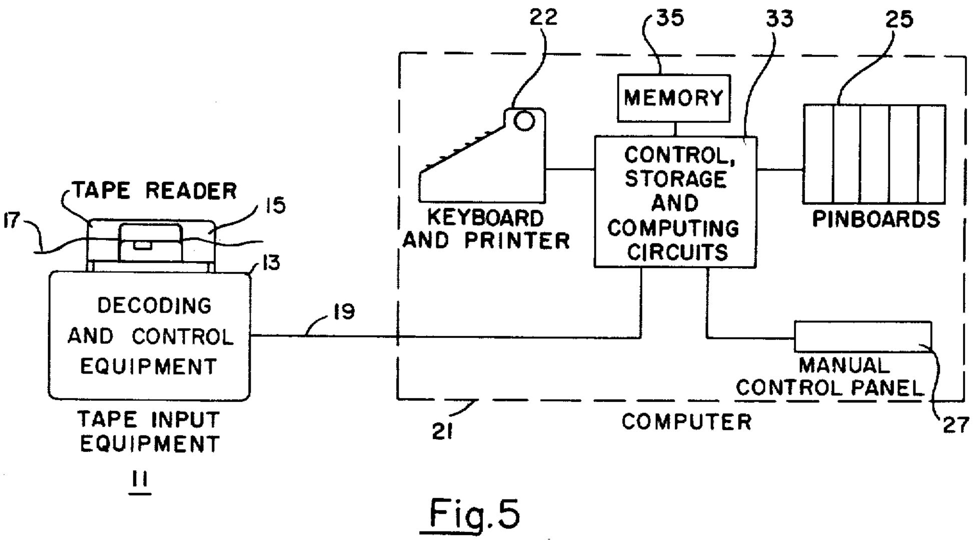
FIG. 5 is a schematic block diagram of the computer and tape input equipment of FIG. 1.

The functional relationship of the tape input equipment to the computer proper is shown in FIG. 5 where it is indicated that information on tape 17, sensed by reader 15, is supplied to the decoding and control equipment mounted in cabinet 13 (FIG. 1) to be translated into electrical signals of a form suitable for transmission over cable 19 to the control, storage and computing circuits 33 of the computer, with which is associated the internal memory 35. Instructions received from the tape input equipment by way of cable 19 actuate the computer circuits in the same manner as instructions received from the pinboard or manual control panel and data received from the tape equipment is treated in a manner similar to data originating at the computer itself.

Figure 3:
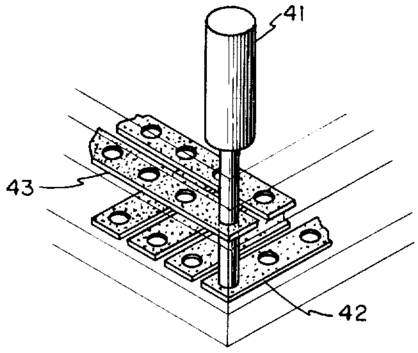
FIG. 3 is a perspective view of a detail of the pinboard of FIG. 2, showing a pin in position therein.
Figure 2:
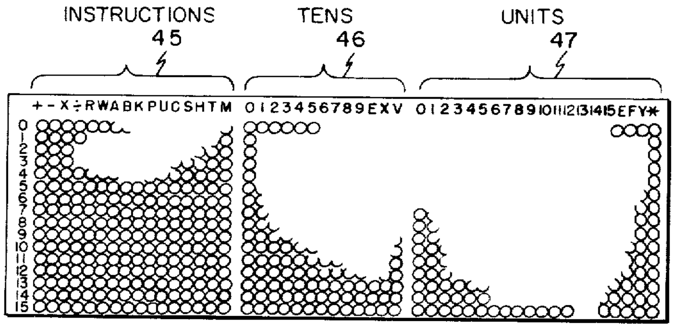
FIG. 2 is a plan view of a pinboard, forming a component of the computer of FIG. 1.
Figure 4:
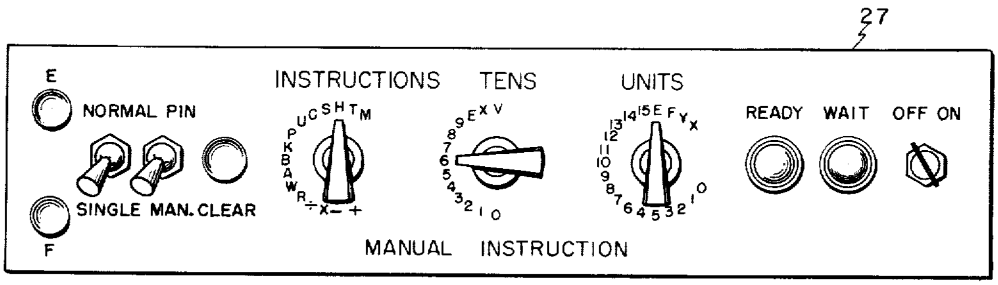
FIG. 4 is a plan view of a manual control panel, forming a component of the computer of FIG. 1.
Figure 9:
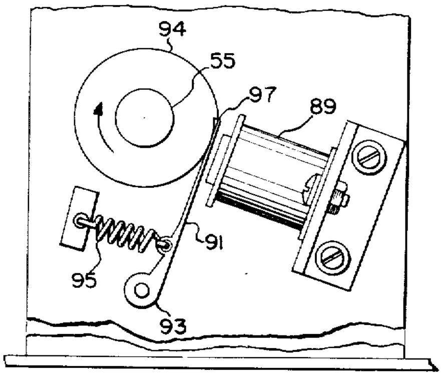
FIG. 9 is a partial end view of FIG. 7, to an enlarged scale.

Details of a single pinboard constituting a unit of pinboard assembly 25, are shown in FIGS. 2 and 3, while the face of manual control panel 27 is shown in FIG. 4. On the face of the pinboard, as seen in FIG. 2, the columns of the hole matrix are numbered from 0 to 15. With each of these a longitudinal bus bar of conducting material is associated, while with each of the matrix rows, designated in accordance with instruction letters and signs and address numerals, a lateral bus is associated in a cross bar arrangement. In setting up a program for the solution of a problem, pins are inserted in the pinboard holes, as pin 41, FIG. 3, to form connections between the column or longitudinally extending bars, as bar 42, and the row or laterally extending bars, as bar 43. Thus, an electrical signal, such as a ground signal, supplied to a longitudinal bar of one of the columns will be transmitted to any cross bar to which a pinned connection is made. Connections may be made from one column to more than one row of a board.

As indicated in FIG. 2, the pinboard is divided into three sections. The first section, referenced 45, is the "Instructions" section, the rows of this section being identified by letters and other symbols used as the first character or instruction proper of an instruction word. In section 46, the "Tens" section, the rows are principally identified by numerals and the same is true of section 47, the "Units" section referenced 47. These last sections supply the second and third characters of an instruction word, where called for.

Figure 13:
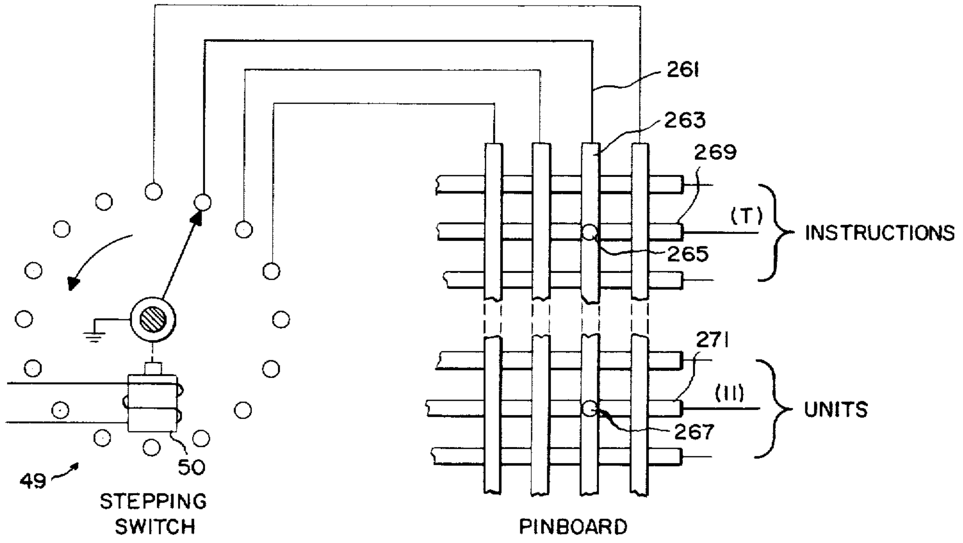
FIG. 13 is a schematic circuit diagram of a section of the pinboard of FIG. 2 connected to a computer stepping switch.

A complete instruction word requires the setting up of one to three cross-connections on the board, only one connection being made in each of the three sections. For example, such a word might comprise the characters +25 which would be interpreted by the computer as calling for the addition of a number in position 25 of the memory to the number then held in the accumulator. The columns, 0–15, of the pinboard are scanned in sequence by a stepping switch or switches, schematically illustrated in FIG. 13 by stepping switch 49, which applies ground successively to the associated longitudinally extending bus bars.

For convenience in describing the operation of the computer, several operating conditions or "states" are referred to of which the initial or idling state of the computer is the one in which the computer circuits are conditioned to receive instructions. Other states are associated with different operating procedures. The signals denoting the existence of various of these computer states, which are supplied by the computer to the tape input equipment for synchronizing purposes, are described in application Serial No. 492,062.

*Tape reader*

A tape reader suitable for operation as a component of the presently disclosed computer input equipment has means for reading information characters coded according to a seven-hole code transversely punched in a paper tape, six holes of the code being used to encode information and the seventh being used for checking purposes. An eight hole reader, which is standard in some types of computing equipment, may be used, without output from the eighth channel.

A preferred reader unit for use with the present equipment is of the intermittently operating pin-sensing type where the operation is under the control of a cam shaft which makes a single revolution to read each character code. Operation of the cam shaft is controlled by an electromagnetically operated single revolution clutch which connects the cam shaft to a constantly running drive pulley. This clutch may be continuously energized for continuous operation of the reader or it may be impulsed for single cycle operation. One operating cycle is required for the reading of each tape character. Since tape readers of this type form parts of available commercial equipment only features thereof which are pertinent to the practice of the present invention will be referred to herein. A detailed description of such a reader is to be found in U.S. Patent No. 2,700,446, issued January 25, 1955 to E. O. Blodgett, particularly with reference FIGS. 40–43 thereof.

Figure 10:
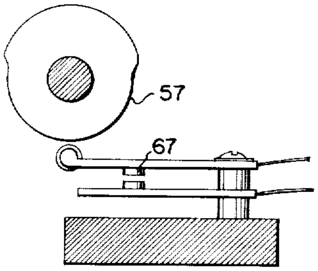
FIG. 10 is a partial sectional view taken along the line 10—10 of FIG. 7.
Figure 12:
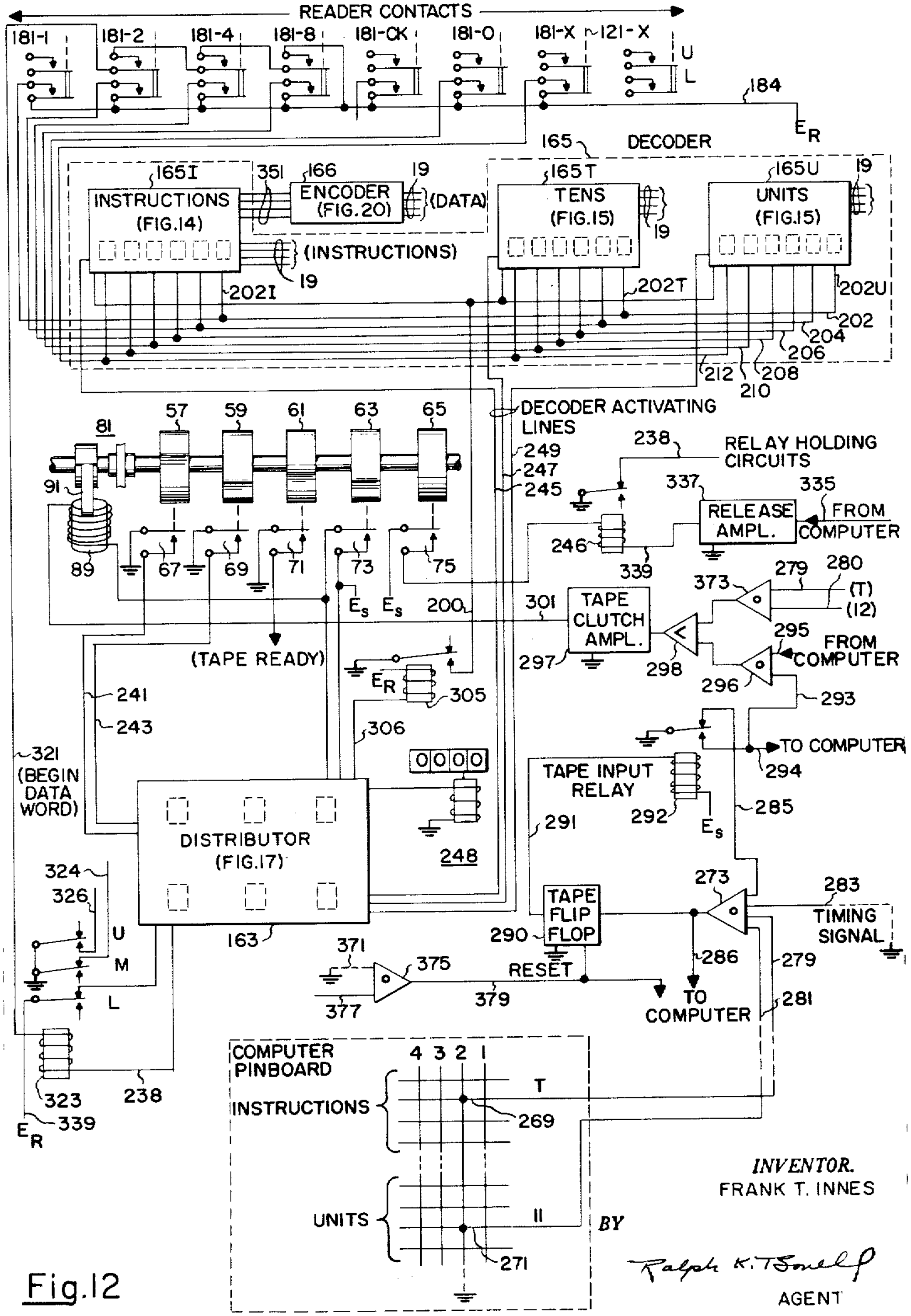
FIG. 12 is a general schematic circuit diagram, partly in block form, of the tape input equipment.

For convenience in following the present description and to point out the novel manner in which the reader assembly is here used, more particularly as to the electrical circuit arrangements, certain structural features of a reader of this type are shown in FIGS. 7 to 10, inclusive. Here motor 51 mounted on base plate 53, is belt-connected to cam shaft 55 by way of friction clutch 81 to operate the shaft at 1200 r.p.m. On shaft 55 there are mounted five cams 57, 59, 61, 63 and 65, which individually operate electrical contacts 67, 69, 71, 73 and 75 as, for example, contact 67 operated by cam 57 (FIGS. 12 and 10).

Single revolution clutch 81 comprises a cylindrical member 83 fast on shaft 55 for rotation therewith and a frictionally cooperative sleeve member 85 mounted for rotation about member 83, against the frictional force between the members, on which is fixedly mounted driven pulley 87. Sleeve 85 is thus rotated continuously by motor 51 while member 83 and shaft 55 are driven intermittently therefrom by friction, when permitted to rotate.

Clutch operating magnet 89 (FIG. 9) has an armature 91, pivoted at 93, which bears against the periphery of stop member 94, fast on shaft 55, when magnet 89 is deenergized. With armature 91 pressed against member 94 by retracting spring 95, a notch 97 in the face of member 94 serves as a stop to hold this member, and camshaft 55, against the tendency to rotate, frictionally induced by the rotation of clutch member 85. Engagement with this stop defines the end of one cycle and the start of a new operating cycle of shaft 55. Energization of magnet 89 draws armature 91 away from member 94 and permits the rotation of shaft 55 under the frictional drive of member 85. If magnet 89 is then deenergized before shaft 55 makes a single revolution, motion of member 94 and of the shaft is arrested at the end of the revolution by the engagement of armature 91 with notch 97. If armature 91 is not released before the completion of a single revolution, shaft 55 continues to rotate.

Figures 7, 8, 11:
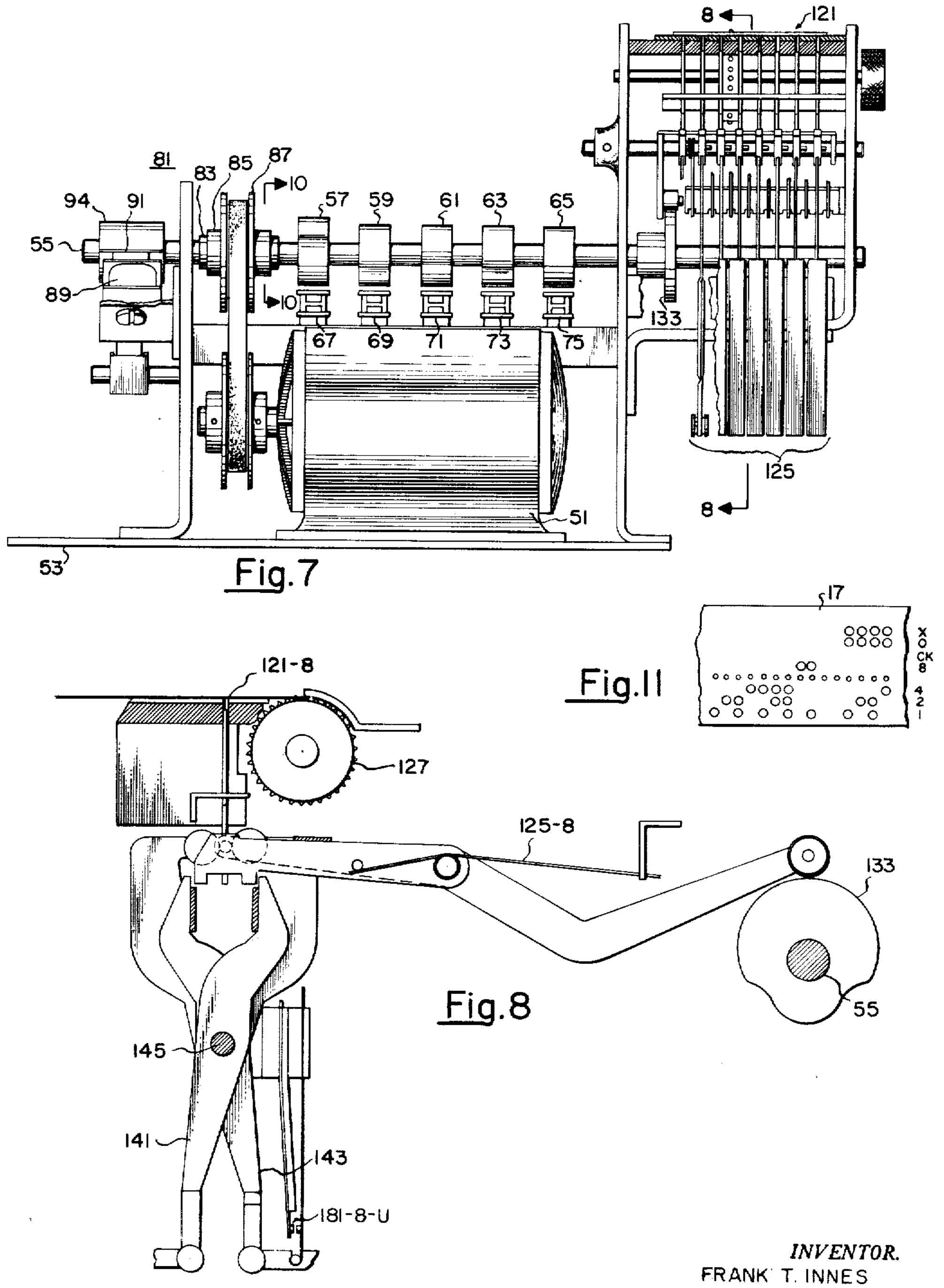
FIG. 7 is a front elevation of a tape reader, forming a component of the tape input equipment.
FIG. 8 is a sectional view taken along the line 8—8 in FIG. 7.
FIG. 11 is a view of a section of punched tape, as used in conjunction with the reader of FIG. 7.

The sensing pin assembly of the reader, as seen in FIGS. 7 and 8, comprises an array of eight pins guided for vertical displacement, collectively referenced as 121, of which the seven active pins will be individually referred to by suffixing the designations of the columns of holes or code channels in which they respectively operate, these being shown with respect to tape 17 in FIG. 11. Pin 121–8, for example, is seen in the sectional view of FIG. 8. The pins are continuously and individually spring-pressed against the tape with a light pressure, pin 121–8 being thus biased by spring 125–8. Accordingly, a pin moves upwardly when a hole in the tape through which it can pass appears in its operating channel. As seen in the section of perforated tape shown in FIG. 11, in addition to character holes there is provided a column of smaller feed holes engageable by toothed feed wheel 127 for advancement of the tape past the sensing pins.

If a pin, for example pin 121–8, is permitted to rise in its guides by the passage of a hole thereby, it causes, through the operation of an interposer-controlled mechanism individual thereto and actuated by cam 133 on camshaft 55, two contact-operating arms 141, 143 pivoted at 145 to approach one another at their upper ends and to separate at their lower ends, which latter displacement operates electrical contacts for a predetermined portion of an operating cycle or revolution of camshaft 55, as determined by the contour of cam 133. Contact 131–8–U operated by arm 143 is seen in FIG. 8. Normally a plurality of such contacts will be operated simultaneously by each of the contact mechanisms individually associated with the several pins, as later referred to. The operation of a cam-actuated interposer mechanism of the type shown in FIG. 8 is fully described in said U.S. Patent No. 2,700,446, columns 29–34.

*Tape input circuitry*

Figure 6:
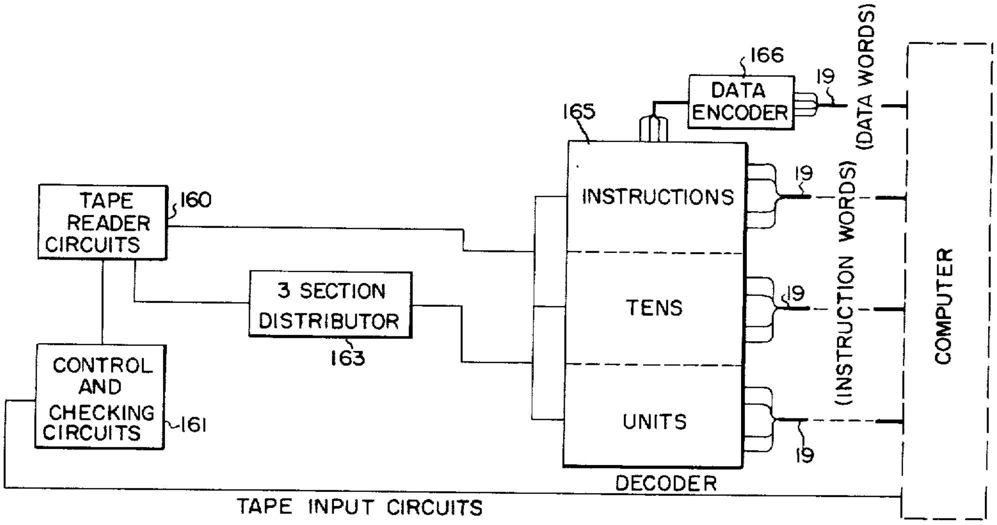
FIG. 6 is a schematic block diagram of the circuits of the tape input equipment of FIGS. 1 and 5.

A functional block diagram schematic of the tape input circuits is shown in FIG. 6. The blocks there shown represent, respectively, circuits 160 associated with tape reader 15, control and checking circuits 161, a three section distributor 163, a decoder 165 comprising decoding circuits operating on the output of tape reader 15 at the Instructions, Tens and Units levels, and a data encoder 166. Coded instruction word signals derived from the tape make use of all three decoder sections, while data characters derived from the tape are decoded in the Instructions section, only, in the manner of the letters or other symbols forming the first character of an instruction word, and these latter signals subsequently are processed by encoder 166 to place them in the same form (binary-coded decimal digits) as data supplied to the computing circuits from sources other than the tape.

The schematic diagram of FIG. 12, is a more detailed showing of the tape input circuits, generally described above, which also indicates the circuits whereby control of the computer is transferred from the pinboard to the tape input equipment. At the top of the figure there are shown the eight banks of pin-operated contacts of a conventional tape reader, seven of which are active in the present equipment. Pins 121 are indicated as dashed vertical lines, pin 121–X being referenced in FIG. 12. The contact assemblies actuated by the pins are referred to, in the manner of the referencing of the pins, by the reference numeral 181 followed by the channel designation as a first suffix, this, in turn, being followed by the letter "U" or "L" indicating the upper or lower contact of a pair operated by one pin, as contact 181–X–L.

It will be noted that the designations of the first four channels of the tape code are in accordance with a four place binary code. These are used for encoding decimal digits. The column designated CK which is reserved for checking purposes will not be further referred to herein. Columns O and X are used, in addition to the other columns, for encoding letters and signs, particularly the first character of an instruction. The six lower contacts 181 (excluding contact 181–CK–L) are connected to the three sections, 165I (Instructions), 165T (Tens) and 165U (Units) of decoder 165 in a parallel circuit arrangement to supply, when operated, relay actuating voltage $E_R$ thereto by way of lead 184, the various sections of the decoder being selectively activated, as needed, by the operation of distributor 163, as later described. A tape signal is thus processed by only one decoder section at a time.

Figure 17:
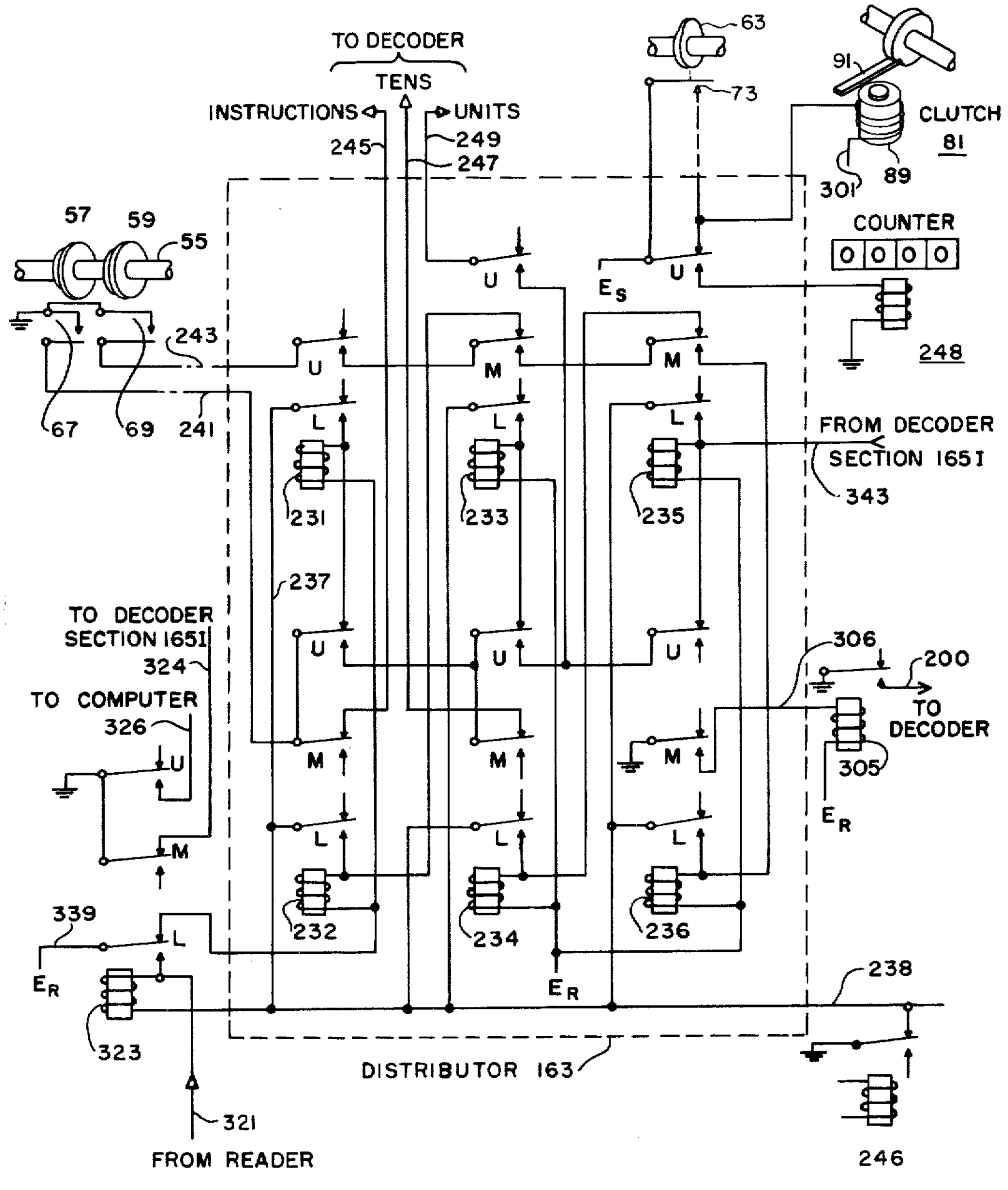
FIG. 17 is a circuit diagram of the distributor of the tape input equipment.
Figure 18:
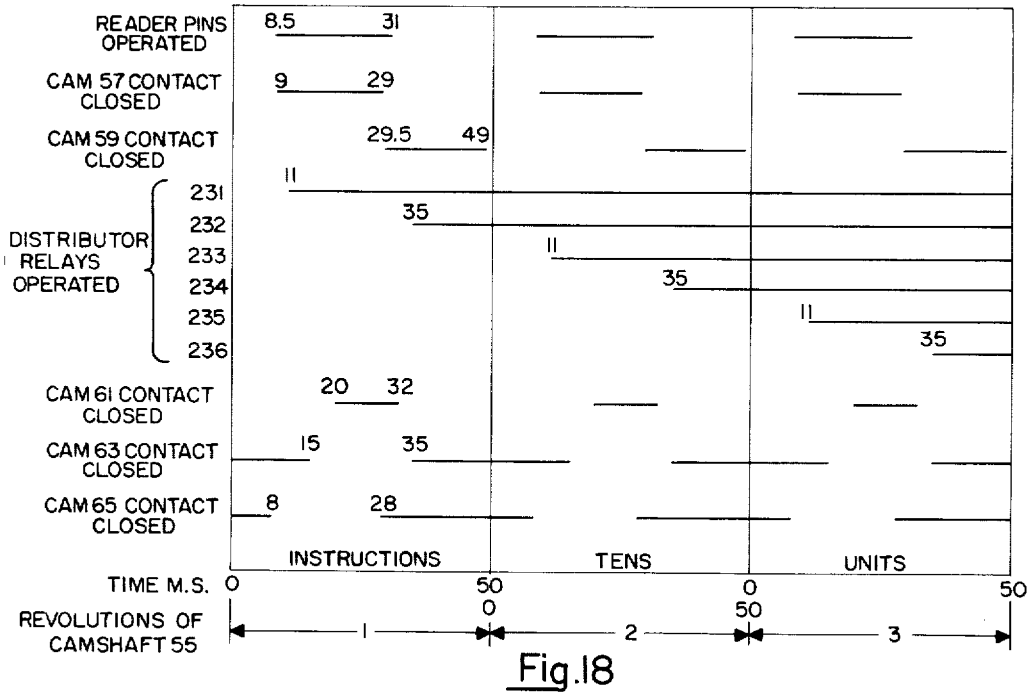
FIG. 18 is a timing chart.

In addition to its indicated connections to decoder 165, distributor 163 also cooperates with the contacts controlled by the cams mounted on camshaft 55 in synchronizing the reading and decoding of information upon the rotation of shaft 55 under the control of clutch 81 as shown in FIG. 17. The timing of the operation of both the reader and of the cam-operated contacts is shown in the diagram of FIG. 18 for three revolutions of camshaft 55, together with the timing of the operation of the distributor relay contacts. At 1200 r.p.m. one camshaft revolution has a period of 50 milliseconds, as indicated. In general, the master control of the timing of operations is exercised by cam contacts rather than by the more delicate relay contacts.

*The decoder*

Figure 14:
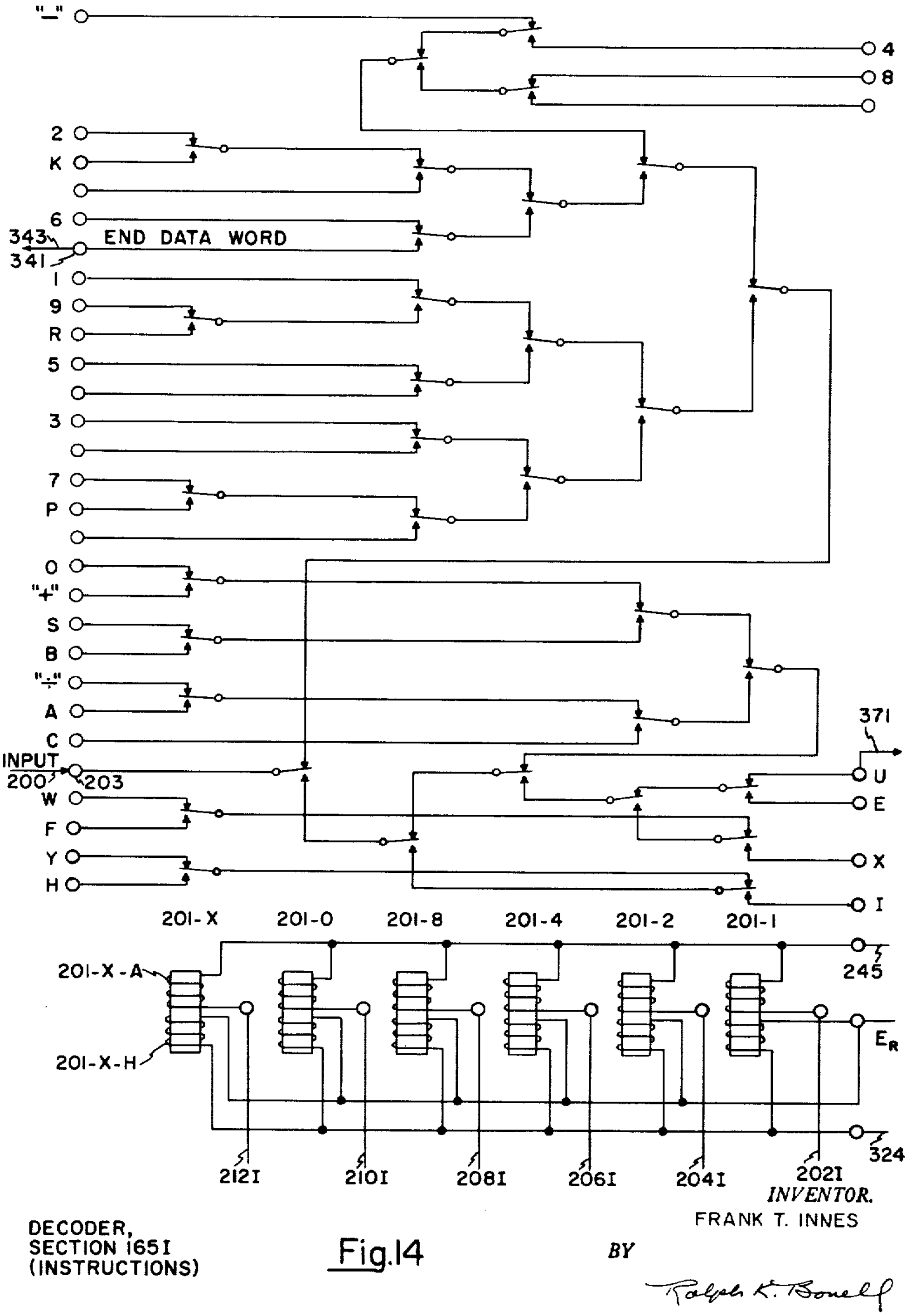
FIG. 14 is a circuit diagram of one decoder section of the tape input equipment.

The three sections of decoder 165 (FIGS. 14 and 15) are similar in construction, with only minor differences therebetween for convenience in the arrangement of certain of the relay contacts. Each section comprises a "folded relay tree" of the general form shown in the book "The Design of Switching Circuits" by Keister, Ritchie and Washburn, on page 52 thereof. In such an arrangement a plurality of relays is used to switch a single input to any one of a plurality of output circuits in accordance with the combination of relays which are jointly operated. In FIG. 14, which shows the relay tree for the Instructions section 165I of the decoder, there are six relays each associated with a channel or column of holes in the input tape, which will be referred to collectively as relays 201 and individually by this number followed by the channel designation as a suffix, as relay 201–X which is the relay operating in channel X, the holes of which are sensed by reader pin 121–X in association with reader pin contacts 181–X. Each relay 201–X has two windings one of which is a holding winding, as winding 201–X–H, which is normally energized but which does not create a strong enough pull on the relay armature to operate an unoperated relay, and an actuating winding, as winding 201–X–A which, upon energization, supplies the additional force necessary to operate the relay, the relay thereafter being held operated until the circuits of both windings are interrupted.

An input to the branched contacts of the relay tree of FIG. 14 is applied at terminal 203, by way of lead 200, and this input, through the selective operation of relays 201, is switched to any one of the several output terminals which bear either the designations found in the Instructions section of the pinboard or are designated in accordance with the decimal digits 1–9, the latter group of terminals being used in the processing of data signals received from the tape, as referred to hereinafter.

Figure 15:
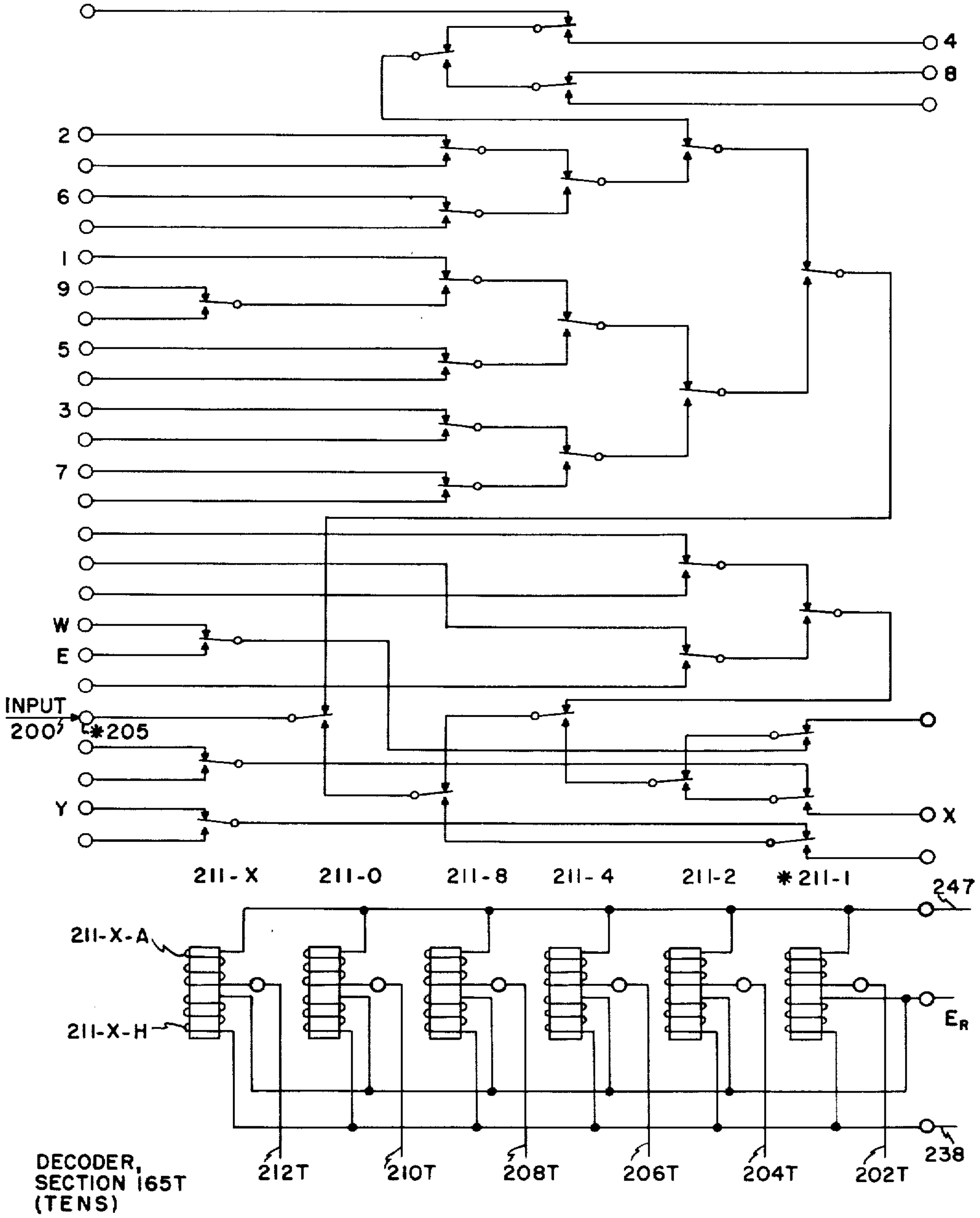
FIG. 15 is a circuit diagram of another decoder section.

The code signals corresponding to a complete instruction word, comprising a letter or sign and two digits, as they come from the reader are decoded successively in the three sections of decoder 165 by their application to the appropriate actuating windings of relays, as relays 201, to permit grounds later to be applied simultaneously, through the relay contact path thus set up, to appropriate instruction input lines going to the computer by way of cable 19. The application of the grounds on input lead 200 and the timing of their duration is under control of the reader camshaft cams. An encoded signal from the reader representing a decimal data digit, is decoded in the Instructions section 165I of the decoder, alone. It is the dual use to which this section is put which requires the provision of output lines corresponding to the several decimal digits as well as to the instructions found in the Instructions section of the computer pinboard, this being indicated in FIG. 14. FIG. 15 is a circuit diagram of the corresponding relay tree for the Tens section 165T of the decoder. The input to its branched relay contact circuit is applied at terminal 205 by way of the same lead 200 which supplies an input to section 165I.

The Units section 165U being same in construction with the Tens section, and the output lines therefrom bearing the similar character designations as in the case of the Tens section, its relay diagram is not separately shown in the figures. A note is included in FIG. 15 as to the distinctive designations of the input terminal and relays of this section.

In section 165I (FIG. 14) relay holding windings 201–X–H etc. have a common connection to relay battery supply $E_R$ and, when energized, a common ground connection supplied by way of lead 324 and relay contact 323M–B; M represents the middle switch and B is indicative of the back contact thereof (FIGS. 17 and 12). The relays of the other two sections 165T and 165U have their holding windings supplied by $E_R$ and receive ground by way of lead 238 and the back contact of relay 246.

Relay actuating windings 201–X–A etc. of section 165I (FIG. 12) receive their energization from voltage source $E_R$ by way of reader contacts 181–1 etc. over connecting leads 202, 204, 206, 208, 210 and 212, the branch connections from these leads to section 165I being identified by the Suffix "I," as lead 202I. Ground for the actuating windings of relays 201 is supplied from distributor 163 over lead 245, as later described with regard to FIG. 17. The energization of the relay activating windings of the other sections also comes from the reader pin contacts by way of the common leads 202, etc., above referred to in connection with section 165I, and the leads branched therefrom bear the respective designations of the sections, as leads 202T and 202U. The ground connection for the relay actuating windings of section 165T is supplied from the distributor by way of lead 247, and for section 165U by way of lead 249.

The outputs of decoder sections 165I, 165T and 165U as well as of encoder 166 reach computer 21 over cable 19 (FIG. 1), only a few of the leads necessary in the cable for this purpose being shown in the drawings.

*The distributor*

Distributor 163 (FIGS. 12 and 17) which functions in the reading and decoding of a three character instructions word, principally comprises a six relay pulse counter, the circuit of which is shown in FIG. 17. This is a known type of circuit an example of which is shown and described in the book "Switching Circuits," previously cited, particularly on page 257 thereof. In the present equipment, the circuit of FIG. 17 is used to activate the three sections, 165I, 165T and 165U, of decoder 165 in sequence. While the distributor is operating, camshaft 55 makes three revolutions during each of which one section of the decoder is activated. In decoding a data character the distributor is inactive. One decoder section is used and one camshaft revolution per data digit is made in this case.

The circuit arrangement of FIG. 17 differs from that of the cited publication in that the relay contact input to the six counting relays is applied as a result of the conjoint operation of cams 57 and 59. As seen in the timing chart of FIG. 18 the contacts respectively operated by these cams are closed in alternation, thereby supplying signals in like alternation to the counting relays in the same manner as would a transfer contact of an input relay ahead of the counter proper, if used. Thus, in the timing chart of FIG. 18, it is seen that cam 57 closes contact 67 shortly after the beginning of a cycle and holds that contact closed until some time past the half-way mark in a revolution of shaft 55. Cam 59 closes contact 69 shortly after contact 67 is opened and holds it closed until very nearly the end of the cycle.

For conciseness in describing the distributor relay circuit of FIG. 17 and its operation the assembly or stack-up of transfer contacts actuated by each relay will be referred to by the number of the relay followed by a letter U, M or L, specifying the position (upper, middle or lower) of the contact in the stack-up. A second letter, F or B, will be used in specifying whether a front or back contact is referred to. Thus, contact 233M–B is a back contact in the middle transfer of the contact stack-up of relay 233.

The circuit and function of the distributor will best be understood by first considering its operation in connection with the reading of an instruction word from the tape, the complete procedure for which is described hereinafter. Its operation in the reading of a data word will then be described in a later section. Assuming camshaft 55 to be rotating, the closing of contact 67 by cam 57 during the first cycle or first camshaft revolution (FIG. 17) provides a path over which an operating ground is supplied for the actuating windings of relays 201 of decoder section 165I, this path being by way of lead 241, contact 232M–B and lead 245. It also operates relay 231, by way of contact 232U–B. Relay 231 is held operated by the ground reaching it by way of contact 231L–F, leads 237, 238 and the back contact of relay 246, remote from the distributor, proper. Closure of contact 231U–F prepares a path for the signal next supplied by the closing of contact 69 by cam 59. When this last-named contact is made, ground to operate relay 232 is supplied by way of contacts 231U–F and 233M–B. Operation of relay 232 breaks, at contact 232U–B, the original path over which relay 231 was operated. Operation of relay 232 also breaks, at contact 232M–B, the connection of ground to lead 245 and thereby deactivates the actuating windings of decoder relays 201, such relays as are operated, however, remaining operated through their holding circuits. Relay 232 and later the other relays of the distributor are held operated, after initial excitation, by the holding ground supplied at relay 246, referred to in connection with relay 231. Their respective operating periods are indicated in the timing chart of FIG. 18.

In a manner similar to that described above, through the operation of the distributor relays, during the second cycle ground is supplied to the actuating windings of relays 211 of FIG. 15 in decoder section 165T by way of lead 247 and during the third cycle to the corresponding relays of section 165U by way of lead 249. Thus, the three decoder sections are successively activated, one at a time, as to their ability to operate from the reader pin contacts, in synchronism with and in suitable phase relationship to the reading of the characters of an instruction word through the joint control of these several events by camshaft 55.

For counting the number of instruction words read, counter 248 of FIGS. 12 and 17, operated by relay 235, is provided. This is principally used in checking a program when first set up.

*Transfer of control from pinboard to tape input equipment*

A special instruction word, here considered to be T11, set up at the computer pinboard, causes control of the computer to pass from the pinboard to the tape input equipment. This pinned instruction is indicated in both FIGS. 12 and 13. In the circuit of the latter figure when stepping switch 49, under the control of its pulsing magnet 50, applies a ground to lead 261 and thence to contact bar 263, the connections set up by pins 265, 267 transfer this ground to crossbars 269 and 271 in the Instructions and Units sections of the board, respectively, the character 11 being found in the latter section.

In the diagram of FIG. 12 there is shown, as an example of the coordination of the operation of tape equipment and computer, a coincidence circuit or gate 273 which requires the simultaneous application of four input signals to obtain an output signal therefrom. Two of the required inputs are grounds on leads 279 and 281, respectively connected to pinboard crossbars 269 (T) and 271 (11). The other required inputs are a ground on lead 285 supplied by way of the back contact of Tape Input Relay 292, signifying that transfer to tape control has not previously occurred, and a timing signal (ground, from the computer) on lead 283 for synchronizing purposes, signifying that the computer is in a suitable operating condition for transfer of control to occur. An output pulse from circuit 273 is first supplied to the computer by way of lead 286 to readjust the computer to a new operating state. This pulse is then applied to Tape Flip Flop circuit 290, which may be of conventional vacuum-tube design or which may include a Thyratron tube or tubes. In either case alternate "set" and "reset" signals are required to effect the necessary changes of state. Circuit 290 is changed from an unoperated to an operated state by an output pulse from gate 273 and thereby applies ground to lead 291 to operate Tape Input Relay 292 the other terminal of whose winding is connected to a source of voltage $E_B$. This relay, in turn, applies ground, by way of its front contact, to lead 293, this ground constituting a "TAPE" signal. The same signal supplied to the computer by way of lead 294 inhibits further scanning of the pinboard.

Figure 21:
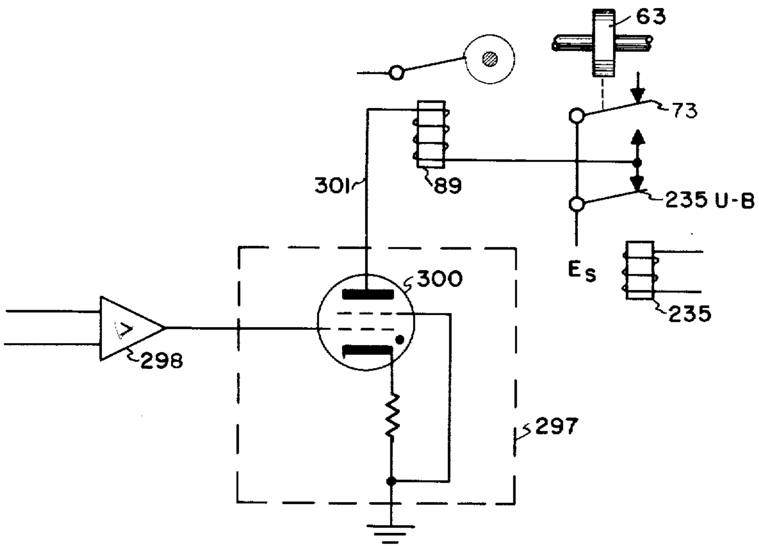
FIG. 21 is a circuit diagram of a component of the input equipment.

The "TAPE" signal in conjunction with a further synchronizing signal from the computer supplied by way of lead 295 causes an output from gate 296 to be applied to Tape Clutch Amplifier 297, by way of mixing circuit 298. This amplifier also, preferably is a holding type of circuit, for example including a Thyratron tube 300 (FIG. 21)

which, once fired, requires resetting, as by interrupting its plate circuit. Amplifier 297, when conducting, applies ground to lead 301 by way of the plate circuit of tube 300, to energize, clutch magnet 89 whose battery connection is by way of parallel-connected contacts 73 and 235U–B. This permits rotation of camshaft 55. During the described shifting of control to the tape, distributor relay 235 is unoperated and contact 235U–B is closed.

*Reading instruction words from tape*

During the reading of a three-character instruction word punched on tape 17, which comprises a letter or sign followed by two digits, camshaft 55, having been put into rotation as above described, makes three consecutive revolutions, timed by distributor 163. During the first revolution or cycle the hole-encoded first character (instruction letter or sign) is sensed by reader 15 and decoded in decoder 165I, the branched relay contacts of which are operated to connect input terminal 203 to one of the plurality of output terminals bearing letter or sign designations and thence by way of cable 19 to an instruction line of the computer. In similar manner connections to two other computer instruction lines are set up by decoder sections 165T and 165U, respectively, in the reading of the second and third characters of the word during the second and third cycles or revolutions of the camshaft.

The actuating windings of the relays of the three decoder sections are activated during the appropriate cycle by the application of ground to leads 245, 247, 249, respectively, as has been described in connection with the operation of the distributor of FIG. 17. During the third cycle after contact 67 is made by cam 57 armature 91 of clutch magnet 89 can be released, camshaft 55, however, continuing to rotate until the end of the cycle when the armature engages stop 97. Deenergization of magnet 89 occurs through the breaking of contact 235U–B in the distributor followed by the breaking of contact 73 connected in parallel therewith, by cam 63, the cam-actuated contact actually breaking the clutch magnet circuit which includes the plate circuit of Thyratron 300 of amplifier 297, thereby resetting the amplifier to an unoperated, non-conducting condition. Later, closure of distributor contact 236M–F operates relay 305, by way of lead 306 and thereby applies ground to lead 200 which connects to relay contact input terminal 203 of decoder section 165I and to the corresponding terminals of the other two sections. Ground is thus simultaneously applied to the instruction lines of the computer which have been selected by the decoder, in accordance with the three characters read from the tape.

Figure 16:
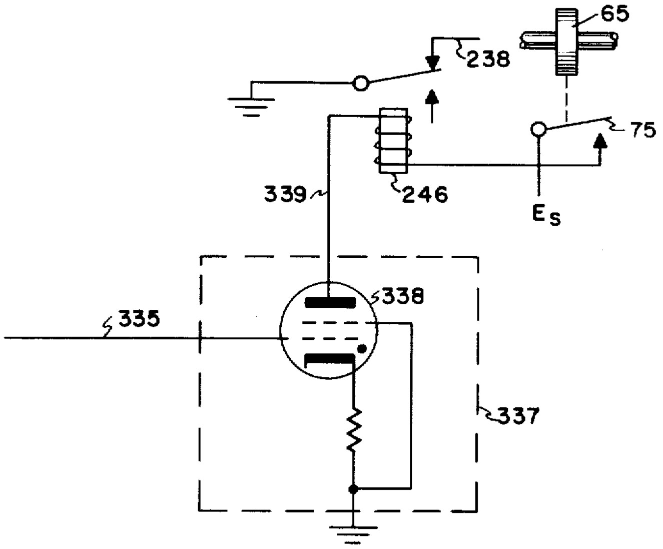
FIG. 16 is a circuit diagram of a thyratron trigger tube used as a component of the input equipment.

As has been noted and as seen in FIG. 18, each distributor relay, after its initial energization, remains operated until after the end of the third cycle, this being accomplished by the holding circuit ground provided at relay 246. Having received a complete instruction word, the computer executes the instruction and passes to an operating state in which a signal is sent back to the tape input equipment by way of lead 335 (FIG. 12) to operate Release Amplifier 337, subject to the control of cam 65. This amplifier includes a Thyratron tube 338 (FIG. 16) which, when fired, applies a ground to lead 339. Therefore, with a signal on input lead 335 and contact 75 closed by cam 65, relay 246 is operated to remove the relay circuit holding ground from lead 238 and thereby release the operated relays directly held by this ground both in the distributor and the decoder and the relays indirectly held thereby through the contacts of relay 323, thus clearing these components. Cam 65 breaks the plate circuit of tube 338, at contact 75, early in the next cycle, to restore ground to lead 238.

*Reading data words from tape*

With the tape input equipment in control of operations, the start of a data work, which may comprise a sequence of any desired number of characters (binary coded decimal digits) is signified by a "Begin Word" character punched in the tape. This character has holes in the 2, 4 and 8 columns of the tape which are sensed by reader pins 121–2, 121–4 and 121–8, respectively, to close serially-connected contacts 181–2–U, 181–4–U and 181–8–U and thereby establish a circuit from the source of relay supply voltage $E_R$ by way of lead 321 to one terminal of the winding of relay 323 to operate said relay, which is then held operated by the connection to $E_R$ provided by lead 339 so long as a holding ground is supplied to the other terminal of the winding by way of lead 238.

The operation of relay 323 breaks, at contact 323L–B, the connection to $E_R$ of the relay circuits of distributor 163 (FIG. 17) so that during the reading of a data word the distributor is rendered inoperative. This is done because data on the tape is decoded in only one decoder section, 165I, where, under appropriate conditions, a data character is treated in a manner similar to the decoding of the first character of an instruction word, to apply a signal to the output line bearing the designation of the decimal value of the character. The operation of relay 323 also breaks, at contact 323M–B, the ground connection of the holding circuit, including lead 324, for the relays of decoder section 165I. The other sections of the decoder are rendered inoperative by the disabling of distributor 163. By closing contact 323U–F the operation of relay 323 sends a signal (ground) to the computer, by way of lead 326 and gating circuits (not shown) to condition the comuputer to receive data. Finally, the closing of contact 71 by cam 61 sends a "TAPE READY" signal to the computer signifying that the input equipment is prepared to transmit data. The timing of this event is seen in FIG. 18.

As has been noted, the operation of relays 201 in the reading from the tape of one of the decimal digits 1–9, inclusive, sets up a circuit from input terminal 203 to the appropriate digit-designated output terminal of this section (FIG. 14). The ground signal applied to terminal 203 by relay 305 upon the closing of contact 67 by cam 57, supplies (through intermediate encoder means later described herein), a signal acceptable to a computer data line, in similar manner to the reading of an instruction word.

At the completion of a data word of one or more characters an "End Word" character is punched in the tape. This comprises the same combination of holes, in columns 2–4–8, as does the "Begin Word" character, but at the end of a data word, decoding of this character, through the described operation of relays 201, sets up a path by way of a lead connected to the activated output terminal, as lead 343 connected to terminal 341, to the winding of distributor relay 235 to operate this relay as shown in FIG. 17. Upon operation of relay 235 one of the pair of parallel-connected contacts controlling clutch magnet 89, contact 235U–B, is broken, the other contact 73 being broken later by the operation of cam 63. Through the resulting de-energization of clutch magnet 89, armature 91 is released and rotation of shaft 55 thereby stopped at the completion of the cycle as defined by the engagement of armature 91 with stop 97.

In order to be acceptable to the computer counting circuits which process data, the signals applied to the digit-designated output terminals of decoder section 165–I must be re-encoded in binary form. This is accomplished by encoder 166, seen in FIGS. 12 and 20. The nine incoming lines 351 from the decoder are connected in a cross bar arrangement to four outgoing lines, collectively referenced 353, corresponding, respectively, to the orders of a four place binary numeral. Individually, these lines are referred to as 353–1, 353–2, 353–4 and 353–8. Connection between incoming lines 351 and outgoing lines 353 is indicated as made at the respective intersections thereof in the encoder diagram by nonreacting or buffer circuits, illustrated schematically in the figure by small circles, as circle 355.

Encoder 166 operates in a conventional manner whereby a signal, for example representing decimal digit "nine" and applied to incoming line 351–9, supplies signals to outgoing lines 353–1 and 353–8 in accordance with the binary notation 1001.

Figure 20:
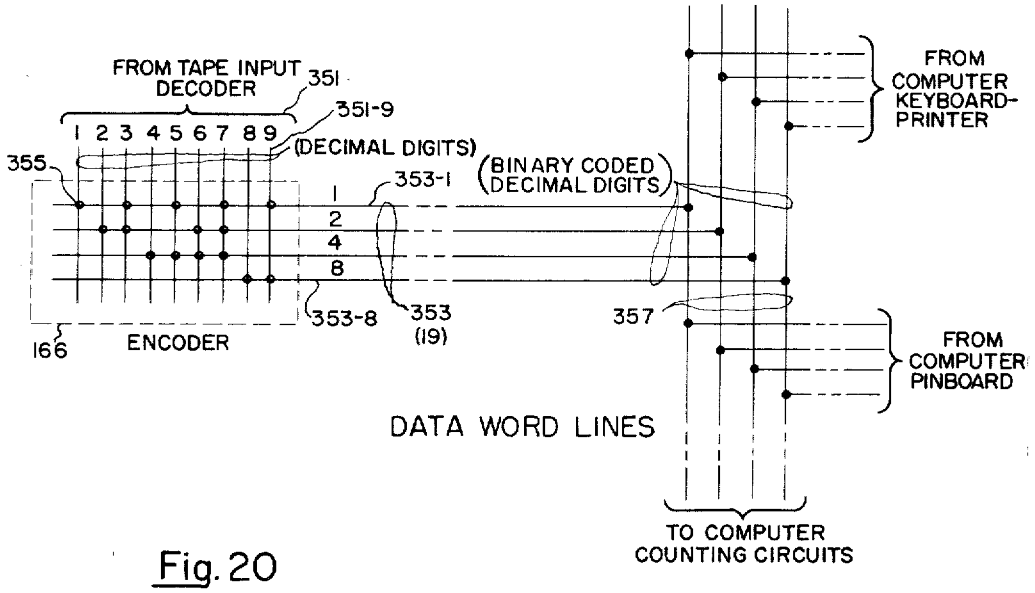
FIG. 20 is a simplified circuit diagram of the tape input and computer Data Word Lines.

Lines 353 continue as conductors in cable 19 and are connected by buffer circuits to trunk lines 357 going to the computer counting circuits, the same lines, under suitable conditions, accepting signals from the computer keyboard printer and from the computer pinboard, as indicated in FIG. 20.

Figure 19:
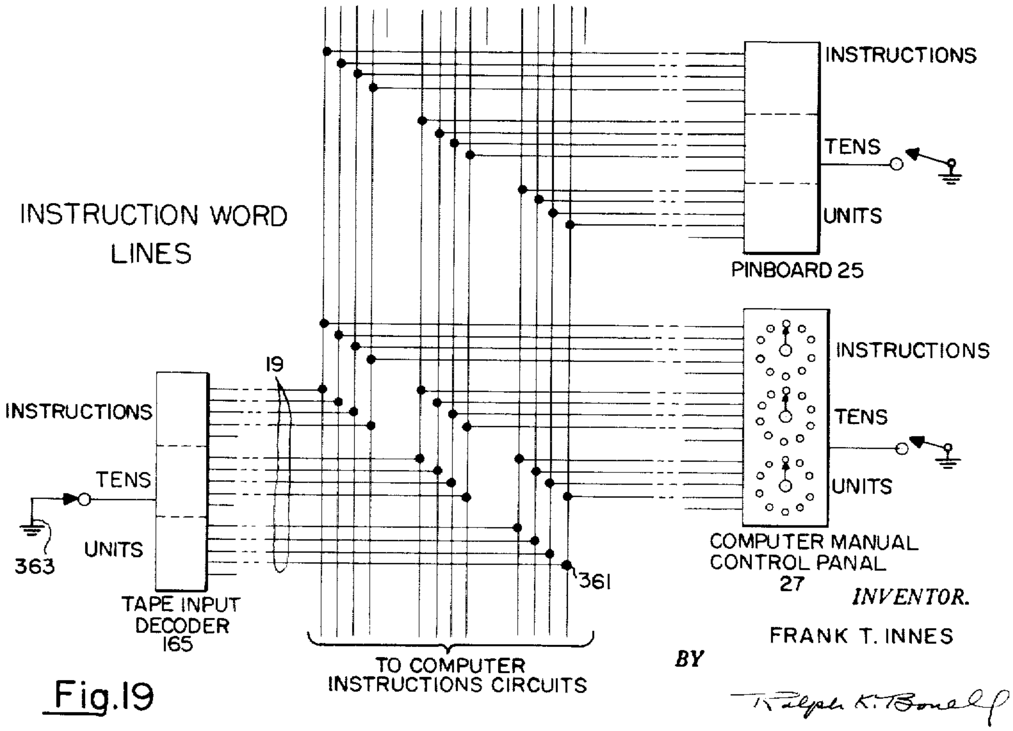
FIG. 19 is a simplified circuit diagram of the tape input and computer Instruction Word Lines.

FIG. 19 illustrates, schematically only, the interconnection of the three sources of instructions for the computer: pinboard, manual control panel and tape. The solid connections between leads 361 are points at which nonreacting circuits or buffers may be introduced.

The selective activation of the three sources, as to their ability to supply signals to the computer instructions lines, is indicated as being carried out by the application of ground, as at 363, to one source at a time, this having been more specifically described with reference to the pinboard and tape equipment.

*Transfer of control from tape to pinboard*

Return of control to the computer pinboard after tape operation is effected by an encoded transfer instruction punched in tape 17. This, for example, might be U51 signifying that an unconditional transfer is to occur to the "fifth" of pinboard of assembly 25 at step or column "one" thereof, the same as if the instruction was pinned in the pinboard of FIG. 2. The decoding of the latter of this word applies a ground to lead 371 (by way of intermediate means, not shown in FIG. 12) which, in conjunction with other required signal inputs (including a computer synchronizing signal on lead 377 signifying that the computer is in a suitable operating condition to accept control) produces an output pulse from gate 375. This pulse applied to "Reset" lead 379 reverses the state of Tape Flip Flop 290 and thus deenergizes Tape Input Relay 292 and thereby removes the tape equipment operating ground supplied at the front contact of said relay. By re-supplying ground to the appropriate pinboard scanning or stepping switch, as switch 49 of FIG. 13, through the operation of the computer circuits under the imposed conditions, pinboard control is resumed. The numerals of the instruction after decoding and re-encoding in binary form are suitably interpreted by the computer circuits to start the scanning operation at the selected position.

The means for effecting transfer of control from the pinboard to Manual Control Panel 27, and in the reverse direction, is described in application Serial No. 492,062. The operation of introducing data by means of the keys of keyboard 23, during manual control, is described in said application and illustrated by FIGS. 30(*a*), (*d*) and (*e*) thereof.

*Reading data from tape with pinboard in control*

The tape input equipment, in addition to its uses above described, may be employed to introduce data into the computer without itself being in control of the operation of the computer, thus functioning as a flexible external memory. To initiate this mode of operation an instruction word different from that which causes a shift in control is set up at the pinboard. This is here considered to be T12, the letter being pinned in the Instructions section and the numeral in the Units section of the board as in the shift of control to the tape. The "T" and and the "12" signals operating by way of leads 279 and 280 respectively, through a gate 373 and mixing circuit 293, (which supplies an output upon receiving a signal over either of its two input leads) operates Tape Clutch Amplifier 297 in the manner described in connection with transferral of control to the tape, to permit the rotation of camshaft 55 and the reading of the data characters from the tape. Other gating signals (not indicated in FIG. 12) may be required in this mode of operation. It will be understood that all coded digits between the begin word and the end word characters will be read into the arithmetic circuits. Relay 292, which supplies the "TAPE" signal when the tape is in control, remains unoperated.

The various ways in which the input equipment of the invention may be used in cooperation with a computer of a particular type and various ways in which control of a computer may be shifted from one to another of a number of devices available for instruction storage purposes, in accordance with the principles of the invention, have been described. It will be understood in this connection that the particular embodiments of the invention shown and described herein are by way of illustration, only, and not by way of limitation. The limits of the invention are defined solely in the appended claims.

What is claimed is:

1. In digital computer apparatus the combination of electrical computing means adapted to receive over individual input circuits a plurality of electrical signals representative respectively of operating instructions, a first switchboard storage medium for the program storage of said operating instructions, means for automatically sequentially scanning said switchboard to sense said instructions and to supply electrical signals in accordance therewith, a second medium for manually programming operating instructions comprising multi-position switches settable to individual ones of said instructions, means for deriving electrical signals representative of operating instructions set in said second medium, a third medium for the program storage of operating instructions comprising a record member in which characters representative of operating instructions appear as an encoded group of holes, means for reading said encoded characters as encoded electrical signals, circuit means including a decoder for decoding said encoded electrical signals into signals representative of operating instructions, and means for selectively applying said electrical signals derived from operating instructions stored in any of said media to the individual instruction input circuits of said computing means.

2. In digital computer apparatus the combination of electrical computing means having input lines for individually applying a plurality of electrical signals thereto, said signals being respectively representative of a like number of characters constituting operating instructions therefor, a first storage medium comprising a crossbar type of switchboard together with means for making cross connections thereat to store instruction characters, means for sequentially sensing said connections to supply electrical signals in respective accordance therewith, a second medium for the storage of instruction characters, means for selectively reading characters stored thereby as encoded electrical signals, means for sequentially decoding said encoded signals to obtain signals similar in character to said first signals including a plurality of decoding circuits, means for activating said decoding circuits in sequence and in synchronism with the reading of characters from said second medium, means for selectively applying signals of like character derived from said two storage media to appropriate ones of said computing means input lines, and means for actuating said last means whereby a change in the source from which instruction signals applied to said input lines are derived is made in accordance with a transfer instruction stored by the currently active medium.

3. The combination claimed in claim 2 wherein the means for activating said decoding circuits includes means for counting the impulses read from said second storage medium to determine the sequence in which the decoding circuits are activated.

4. In digital computer apparatus the combination of computing means adapted to receive a plurality of operating instructions in the form of electrical signals as inputs thereto over individual input circuits, a first medium for the storage of instructions comprising a crossbar type switchboard together with means for making cross connections thereat respectively representative of such instructions, means for automatically sequentially scanning said switchboard to sense said connections and to supply electrical signals in accordance therewith, a second medium for manually setting instructions comprising multi-contact switches settable in accordance with said instructions, means for deriving signals of the same character as said first signals in accordance with the settings of said switches, a third medium for the storage of instructions comprising a record member in which characters representative of the information stored thereby appear as an encoded group of holes, means for reading said encoded characters as encoded electrical signals, circuit means including a decoder for decoding said electrical signals into signals of the same form as said first two signals, and means for selectively applying signals derived from the instructions stored by any of said media to the instructions input circuits of said computing means.

5. In digital computer apparatus the combination of computing means adapted to receive both operating instructions and data in the form of electrical signals as inputs thereto over individual input circuits respectively assigned to said two classes of information, a medium for the storage of instructions comprising a cross bar type switchboard together with means for making cross connections thereat representative of such instrutcions, means for automatically scanning said switchboard to sense said connections and to supply electrical signals in accordance therewith, a second medium for the storage alternatively of instructions and data comprising a record member for storing encoded characters respectively representative of said two types of information, means for reading said characters and for supplying encoded electrical signals respectively corresponding thereto, circuit means including a decoder for distinguishing between encoded instruction and encoded data signals derived from said second medium and for decoding the former to signals of the same form as signals derived from said first medium, means for selectively applying said first or second medium instruction signals to the instructions input circuit of said computing means, and means for applying signals derived from said encoded electrical data signals to the data input circuit of said computing means.

6. The combination claimed in claim 5 wherein data characters on said record member are set apart from instruction characters, as to the beginning and end thereof, by special encoded characters stored by said record member.

7. In combination, a digital computer having pinboard means for setting up a program of operating instructions for the computer, means for automatically scanning said pinboard to develop, when activated, electrical instruction signals, manual control means for developing, when activated, like instruction signals, record means for storing encoded instruction signals, means for reading said record-stored encoded signals and for decoding the same to furnish, when suitable actuated, instruction signals of the same form as said first two sources thereof, and means actuated by instructions stored by the currently active one of said several sources of instructions terminating the supply of instruction signals to the computer therefrom and automatically initiating the supply of instructions from another of said sources, said last means including means for activating the newly selected source.

8. Digital computer apparatus for reading hole-encoded characters as positions along a record member registering with positions in a uniformly longitudinally spaced sequence of possible character positions and for controlling the grouping of the characters thus reading comprising, in combination, a source of motive power, a shaft, clutch means for driving said shaft from said source through an integral number of revolutions, only, measured from a reference position of the shaft, means operated from said shaft for advancing a record member one character position during each revolution of the shaft, character reading means adapted to co-operate with a record member thus advanced and operated from said shaft once during each revolution of the shaft, control means for said clutch means causing said shaft to be driven in said manner through a selected integral number of consecutive revolutions thereof, and means for actuating said control means in accordance with character information supplied by said character reading means.

9. Apparatus as defined in claim 8 wherein said clutch control means includes means normally holding said shaft in said reference position and means for rendering said last means ineffective for a period less than that of said selected number of revolutions of the shaft but greater than that of the next lower number of revolutions.

10. Tape input equipment for a digital computer comprising a tape reader adapted to read hole-encoded characters from a tape member as encoded electrical signals, said reader having hole-sensing means together with associated contacts operating in conjunction with a source of electrical potential to generate said signals, motive means, a member adapted for continuous rotation thereby, a shaft intermittently operated from said member mounting a plurality of cams, contacts respectively associated with said cams for actuation thereby and a single revolution clutch controlling said intermittent operation, said equipment further comprising a plurality of circuits for individually and in sequence decoding signals of a group of predetermined length of said encoded signals including circuit means for applying said signals thereto, an impulse counting circuit, means including one of said cam actuated contacts operating in conjunction with a source of electrical potential for supplying impulses in sequence to said counter once during each revolution of said shaft, circuit means for activating said decoder circuits in sequence and in synchronism with the advancement of the count registered by said counter, and means for operating said clutch to cause single revolution operation of said shaft including means for holding said clutch operated to permit a sequence of single revolutions of said shaft to be completed.

11. Tape equipment for a digital computer comprising in combination a tape reader for reading hole-encoded characters from a tape member as encoded electrical signals, said characters according to their coding being adapted to convey one of two types of information, a decoder of the relay tree type for decoding said signals, means for supplying an output from the branched circuit thereof to a computer over a first path during the reading of information of one type, and means for supplying an output of said decoder circuit to said computer over a second path subsequent to the reading of a character signifying the start of information of the other type, said last means including an encoder for re-encoding characters conveying said second type of information.

12. The combination claimed in claim 11 wherein characters conveying said second type of information represent decimal digits, respectively, and the output signals of said encoder are in the form of binary encoded decimal digits.

13. In tape input equipment for a digital computer the combination of a tape reader having means adapted for the reading of characters from a tape member as electrical signals and cam means operating synchronously therewith, a circuit for counting electrical impulses, means operated by said cam means for supplying recurrent impulses to said counter for registering and advancing a count in synchronism with the reading of said tape characters, and a plurality of normally inactive decoder circuit means individually operative in sequence for modifying successive ones of said read signals in synchronism with the advancement of the count.

14. The combination claimed in claim 13 wherein counter means actuated by said read signals is provided to control the operability of said decoder circuit means.

15. Tape input equipment for a digital computer comprising in combination tape reader means adapted to read a hole-encoded character stored by a tape member as an encoded electrical signal constituted by a plurality of component signals, a relay tree comprising relays alike in number with said component signals adapted to actuate a branched circuit for connecting a single input to a plurality of outputs in accordance with the ones of said relays jointly operated, circuit means for applying said component signals to the windings of said relays, respectively, to operate the relays, means for subsequently applying a signal to the input of said branched circuit for routing to one of the outputs thereof, and means for timing the operation of said last means in synchronism with and in selected phase relationship to the reading of said character.

16. Tape input equipment as defined in claim 15 wherein said tape reader means includes cam means controlling the reading of tape characters and said last timing means includes cam means operated in synchronism with said reading cam means.

17. In digital computer apparatus the combination of electrical computing means having input lines respectively accepting electrical signals of a group composed of a selected number of signals of a first type, a medium for storing information as groups of characters each group being of the size of said signal groups, means for sequentially reading the characters of a group stored by said medium as electrical signals of a second type, a plurality of normally inactive circuit means for individually and in sequence translating second type electrical signals of a group read from said meidum into first type electrical signals, means for sequentially activating said plurality of circuit means in synchronism with the reading of the characters of a group stored by said medium and for applying the read signals to the respective inputs thereof, and means for applying the individual signals of a group of first type electrical signals derived from the output of said translating means to said computer input lines, respectively.

18. Record input equipment for a digital computer comprising in combination a record reader for reading in sequence as encoded electrical signals hole-encoded characters longitudinally spaced along a record member, said characters representing data of two types and supplying information to distinguish therebetween, decoder means for decoding said signals to furnish respectively corresponding signals of a different character, circuit means normally supplying decoded signals from said decoder to means utilizing data of one of said two types, alternative circuit means receiving decoded signals from said decorder means and supplying re-encoded signals to means utilizing data of the other of said two types including re-encoding means, and means for selectively routing decoded signals to said two circuit means responsive to information read by said record reader.

19. In and externally programmed digital computer apparatus; the combination of data accepting means and operating instruction accepting means in the computer; first external storage means for data; second external storage means for operating instructions; third external storage means for both data and operating instructions; external control means responsive to an operating instruction for selectively supplying data and operating instructions from any of the appropriate ones of said storage means to said data accepting means and to said operating instruction accepting means, respectively; and means in the computer responsive to said operating instruction accepting means in accordance with operating instructions selectively read from either of said second or third storage means.

20. The combination defined in claim 19 wherein data and instructions respectively read from said first and second storage means are of a common code type and data and instructions read from said third storage means are of a different code type, and means are provided for decoding said instructions and encoding and then decoding said data read from the storage means.

21. In an externally programmed digital computing apparatus, the combination of data accepting means and program instruction accepting means in the computer, an external storage means for storing data, an external pluggable control panel storage means for storing program instructions, an external tape storage means for storing both data and program instructions, external control means responsive to an operating instruction for selectively deriving data and program instructions from one or more of said storage means and supplying the same to said data accepting means and to said program instruction accepting means, and means in the computer responsive to said operating instrutcion accepting means in accordance with program instructions read from either of said second or third storage means.

22. In an externally programmed digital computing apparatus, input lines to computer computational circuits, input lines to program control circuits, a manually operated keyboard coupled to said computational circuit input lines for entering data for computational purposes, a pluggable control panel operatively connected to said program circuit input lines for entering program instructions thereinto, record reading means operatively connected to said computational circuit input lines and to said program circuit input lines for respectively entering data stored on a record into the former lines and for entering program instructions into the latter lines, external means for deriving data from said keyboard or from said record reading means and for supplying such derived data to the computational circuit input lines, and external means for selectively deriving program instructions from either said pluggable control panel or from said record reading means for supplying such derived instructions to the instruction circuit input lines.

23. In an externally programmed digital computing apparatus, the combination of computing means adapted to receive data and operating instructions in the form of electrical signals as inputs thereto from individual input circuits, a first medium for manually entering data for computational purposes, means for deriving signals from said first medium in accordance with the manual setting thereof, a second medium for the storage of operating instructions comprising a switchboard having removable plugs for making cross connections thereat external, means for automatically sequentially scanning said switchboard to sense said connections and to supply electrical signals in accordance therewith, a third medium for the storage of data and operating instructions comprising a record member in which the characters representative of the information thereon appear in encoded from on discrete areas of the member, external means for reading said encoded characters on the record member as electrical signals, and means for selectively applying the signals derived from said three media to the input circuits in accordance with the operating instructions stored in either of said second or third media.

24. In an externally programmed digital computing apparatus, pinboard means for programming instruction operations of the computing apparatus, a record reading device for alternatively programming instruction operation of the computing apparatus, said record reading device including record medium advancing means operating in synchronium therewith for successively presenting different portions of the operating instruction on a record medium to the record reading device until a complete operating instruction is read thereby, and computer control circuits connected to said pinboard means and to said reading device and having different instruction control levels for controlling the operation of the computing apparatus, said control circuits including means responsive to a particular operating instruction from the pinboard means for causing the reading device to read a complete operating instruction from a record medium, whereby computer instruction operation is controlled by the information then read from said record reading device.

25. The combination recited in claim 24 further characterized in that means is provided which is responsive to a particular instruction read by said reading device from a record medium for causing said pinboard means to resume instruction operation of the computing apparatus.

26. In an externally programmed digital computing apparatus, pinboard means for programming instruction operations of the computing apparatus, record reading means for alternatively programming instruction operation of and for introducing data into the computing apparatus, and computer control circuits connected to said pinboard means and to said reading means and having different instruction control levels for controlling the operation of the computing apparatus, said control circuits including means responsive to operating instructions from the pinboard means for causing the reading means to read an operating instruction and data from a record medium, whereby computer instruction operation is controlled by the information then read from said record reading means.

27. The combination recited in claim 26 further characterized in that means is provided which is responsive to an operating instruction read by the record reading means for causing the pinboard means to resume instruction operation of the computing apparatus.

References Cited in the file of this patent

UNITED STATES PATENTS

| | | |
|---|---|---|
| 2,434,500 | Leathers et al. | Jan. 13, 1948 |
| 2,493,858 | Carroll | Jan. 10, 1950 |
| 2,516,013 | Mixer | July 18, 1950 |
| 2,604,262 | Phelps et al. | July 22, 1952 |
| 2,643,172 | Reiss | June 23, 1953 |
| 2,657,856 | Edwards et al. | Nov. 3, 1953 |